No. 835,607. PATENTED NOV. 13, 1906.
R. E. GIERHART & C. O. HANSEN.
DEVICE FOR REGULATING THE SPEED OF ANY AND ALL MACHINES.
APPLICATION FILED JAN. 22, 1906.
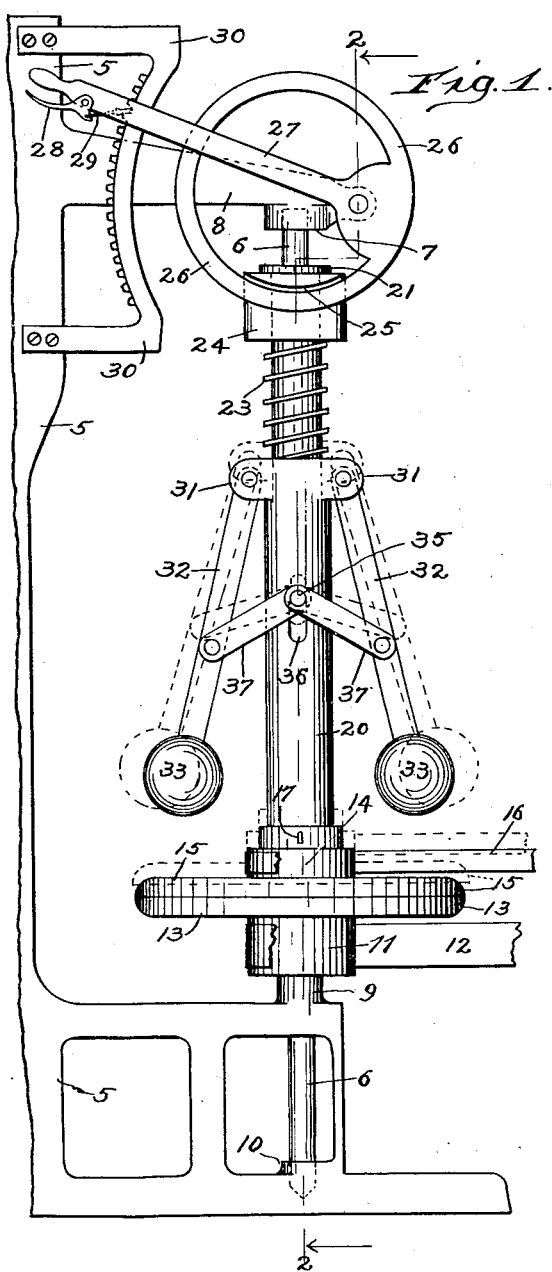
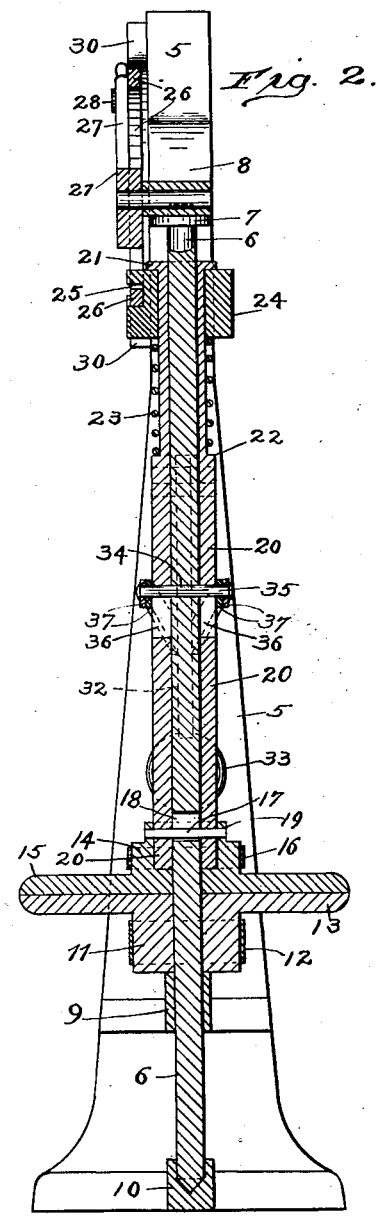
Witnesses:
Chas. E. Gorton.
M. A. Nyman
Inventor's:
Ralph E. Gierhart.
And Charles O. Hansen.
By Chas. C. Tillman
Atty.

UNITED STATES PATENT OFFICE.

RALPH E. GIERHART AND CHARLES O. HANSEN, OF ARGYLE, WISCONSIN.

DEVICE FOR REGULATING THE SPEED OF ANY AND ALL MACHINES.

No. 835,607.  Specification of Letters Patent.  Patented Nov. 13, 1906.

Application filed January 22, 1906. Serial No. 297,390.

*To all whom it may concern:*

Be it known that we, RALPH E. GIERHART and CHARLES O. HANSEN, citizens of the United States, residing at Argyle, in the county of Lafayette and State of Wisconsin, have invented certain new and useful Improvements in a Speed-Regulating Apparatus, of which the following is a specification.

This invention relates to improvements in an apparatus to be used for regulating the speed of various kinds of machines or a number of individual machines driven from the same shaft without affecting or changing the rate of speed of the engine or primary power; and it consists in certain peculiarities of the construction, novel arrangement, and operation of the various parts thereof, as will be hereinafter more fully set forth and specifically claimed.

The principal object of our invention is to provide an apparatus of the above-named character which shall be simple and inexpensive in construction, strong, durable, and effective in operation, and so made that it may be employed for the regulation of the speed of machines when operated by any kind of power, such as steam, water, wind, hydrocarbon, or electricity.

In order to enable others skilled in the art to which our invention pertains to make and use the same, we will now proceed to describe it, referring to the accompanying drawings, in which—

Figure 1 is a view in side elevation of a speed-regulating apparatus embodying our invention, showing the parts by continuous lines in their operative positions to transmit a high rate of speed from the main shaft to the individual machine or machine to be driven and by dotted lines the positions the parts may assume in the operation of the device, and Fig. 2 is a sectional view taken on line 2 2 of Fig. 1 looking in the direction indicated by the arrows.

Like numerals of reference refer to corresponding parts throughout the different views of the drawings, in which we have shown the apparatus in a vertical position; but we wish it understood that it may be placed horizontally or otherwise.

The reference-numeral 5 designates the main frame, which may be of any suitable size, form, and material, and has journaled thereon a main or driving shaft 6, which is usually mounted at one of its ends in a bearing 7 on a bracket 8, which extends laterally from the main frame near one of its ends, and in suitable bearings 9 and 10 on the other end of the main frame. Loosely mounted on the shaft 6 near one of its ends is a pulley 11, which receives power from an engine or other source of power-supply (not shown) through a belt 12 and is provided with a disk 13, which is preferably made integral therewith, as shown, so as to rotate with said pulley. Loosely mounted on the shaft 6, but non-rotatably secured thereto, is a pulley 14, which carries a disk 15 to coact with the disk 13, as will be presently explained. Passing around the pulley 14 is a belt 16, which extends to and engages a part of the individual machine or the machine to be driven. (Not shown.) The pulley 14 is longitudinally movably, yet non-rotatably, secured on the shaft 6 by means of a rod or bar 17, which passes through a slot 18 in the shaft 6 and also through the hub 19 of said pulley, as well as through a sleeve 20, which surrounds the shaft 6 and extends to near its upper end, as shown in the present drawings. The upper end of the sleeve 20 is provided with an annular flange 21 and has its portion just below said flange reduced, thus forming an annular shoulder 22, against which one end of a spring 23, which surrounds the sleeve 20, will rest.

Loosely mounted on the reduced portion of the sleeve, just below the flange 21 thereof, is a collar 24, which has on one of its sides a curved groove 25 to receive a portion of an eccentric 26, which is fulcrumed on the bracket 8 and has a handle 27, which is equipped near its free end with a gripping-lever 28, which lever carries a pawl or catch 29 to engage the teeth of a segmental rack 30, secured to the main frame near the bracket 8 thereof. The sleeve 20 is provided between its ends and usually at or near the shoulder 22 with oppositely-disposed projections 31, to each of which is pivotally secured one end of a governor-arm 32, on the other end of each of which is mounted a ball or weight 33 of suitable size and material. Located in a transverse opening 34 in the shaft 6 at a point near the projections 31 is a rod 35, which has its ends extended through longitudinal slots 36, formed in the sleeve 20 at a point between the projections 31 and the pulley 14 thereon. Pivotally connected at one of their ends to each end of the rod 35 are links 37, which are pivotally connected at their other ends to the arms 32, between the weights on said arms and their pivoted ends.

From the foregoing and by reference to the drawings it will be understood and seen that our invention is very simple in construction and operation and that by applying power from an engine or the primary source through the belt 12 or a suitable connection to the pulley 11 the latter, as well as the disk 13, which it carries, will be caused to rotate on the shaft 6 until by reason of the frictioned contact therewith of the disk 15, carried by the pulley 14, said shaft, as well as the last-named pulley, will be caused to rotate, thereby transmitting, through the belt or connection 16, power to the machine to be driven. In this operation as soon as the velocity of the driving-shaft and the pulleys and disks thereon becomes sufficient, by reason of the centrifugal action of governor-balls and arms, to overcome the pressure of the spring 23, which actuates the sleeve 20, it is obvious that the said sleeve will be moved on the shaft 6, so as to disconnect the disks 13 and 15, when by reason of the retarding effect of the machine being driven the speed of the driving-shaft and sleeve 20 will be decreased, thus permitting the governor to again move the disk 15 into frictioned contact with the other disk. It is apparent that the tension of the spring 23 may be regulated to the desired degree by turning and securing the eccentric 26 in the proper direction, in which operation the tension of the spring will be increased or diminished by means of the collar 24, which through its engagement with the eccentric will be moved back and forth on the sleeve.

Having thus fully described our invention, what we claim as new, and desire to secure by Letters Patent, is—

In a speed-regulating apparatus, the combination with the main frame, of a driving-shaft journaled thereon, a pulley and a disk mounted to turn in unison on said shaft and adapted to receive power from a primary source, another pulley and another disk movably but non-rotatably mounted with respect to said shaft on the same and adapted to transmit power to the machine to be driven, a spring-actuated sleeve mounted on the shaft to turn therewith but so as to move longitudinally thereon and connected at one of its ends to the last-named pulley, weighted governor-arms pivotally connected at one of their ends to said sleeve, links uniting said arms between their ends to the said shaft, a grooved collar mounted on the sleeve in engagement with the actuating-spring thereof, an eccentric journaled on the main frame in engagement with said collar, and means to turn the eccentric and to secure it against movement, substantially as described.

In witness whereof we have hereunto signed and sealed this specification this 18th day of January, A. D. 1906.

RALPH E. GIERHART. [L. S.]
CHARLES O. HANSEN. [L. S.]

Witnesses:
OSCAR L. HANSEN,
CHARLES F HEGGE